United States Patent [19]

Iida et al.

[11] Patent Number: 4,699,024
[45] Date of Patent: Oct. 13, 1987

[54] DEVICE FOR ADJUSTING THE ANGULAR POSITION OF ONE MEMBER RELATIVE TO ANOTHER

[75] Inventors: Norikazu Iida, Toyota; Ryoichi Fukumoto, Nagoya; Keiji Mori, Kariya, all of Japan

[73] Assignee: Aisin Seiki Kabushiki Kaisha, Aichi, Japan

[21] Appl. No.: 865,439

[22] Filed: May 21, 1986

[30] Foreign Application Priority Data

May 21, 1985 [JP] Japan .............................. 60-106892
May 21, 1985 [JP] Japan .............................. 60-106893

[51] Int. Cl.$^4$ .............................................. F16H 1/28
[52] U.S. Cl. ...................................... 74/805; 350/637; 350/632
[58] Field of Search .................. 74/804, 805; 350/637, 350/631, 632

[56] References Cited

U.S. PATENT DOCUMENTS

| 4,426,064 | 1/1984 | Healy ................................ 74/804 X |
| 4,453,767 | 6/1984 | Walk et al. ........................ 74/804 X |
| 4,466,712 | 8/1984 | Vitaloni ............................ 350/632 X |
| 4,468,063 | 8/1984 | Yukimoto et al. ................. 74/804 X |
| 4,469,375 | 9/1984 | Boyer ............................... 74/805 X |
| 4,504,116 | 3/1985 | Sharp ............................... 350/637 X |
| 4,632,525 | 12/1986 | Hayashi et al. ................... 350/637 X |

FOREIGN PATENT DOCUMENTS

| 3013009 | 10/1981 | Fed. Rep. of Germany ...... 350/632 |
| 159543 | 10/1982 | Japan . | |
| 8301843 | 1/1984 | Netherlands ........................ 350/637 |
| 2128564 | 5/1984 | United Kingdom ................ 350/632 |

Primary Examiner—Leslie Braun
Assistant Examiner—D. Wright
Attorney, Agent, or Firm—Burns, Doane, Swecker & Mathis

[57] ABSTRACT

An angular position adjusting device including a planetary gear mechanism intervening between a fixed member and a movable member rotatably arranged relative to the fixed member in such a way that the relative gear engagement position between an inner gear and an outer gear of said planetary gear mechanism is changeable when any one of the inner gear and outer gear is eccentrically rotated by an eccentrically rotatable member. The planetary gear mechanism is in engagement with one of the fixed member and the movable member and a torque limiting coupling means intervenes between the planetary gear mechanism and the other of the fixed member and the movable member. A motor for rotating the eccentrically rotatable member may be mounted on any one of the movable and fixed members. With a compact size a high gear reduction ratio and a high shock damping are realized.

31 Claims, 20 Drawing Figures

DEVICE FOR ADJUSTING THE ANGULAR POSITION OF ONE MEMBER RELATIVE TO ANOTHER

BACKGROUND OF THE INVENTION

1. Field of the Invention

The present invention relates to an angular position adjusting means for adjusting the pivotal angle of a movable member to a desired angular position relative to a fixed member at a relatively high reduction ratio in relative speed with such a function as to damp a shock applied to the movable member.

2. Description of the Prior Art

As an example of the angular position adjusting devices such that the pivotal angle of a movable member can be adjusted manually or by a motor at a high rotative speed reduction ratio and additionally a shock damping function is provided for safety, it is possible to give a mirror adjusting mechanism for an automotive vehicle disclosed in Japanese Utility Model Kokai Publication No. 57-159543 by way of example.

The structure of this mirror adjusting mechanism is as follows: a mirror body is pivotable in the horizontal direction relative to a post attached to a front fender. The mirror body is pivotably supported by a shaft fixed to the post through a spring washer. On a bottom plate of the mirror body, a reduction gear including a motor is fixed. The output gear of the reduction gear is in mesh with a gear fixed to the above-mentioned shaft. When the motor is driven to rotate and move the output gear about the gear fixed to the shaft, the mirror body pivotes about the post against a frictional force of the spring washer. This mechanism is further provided with an electromagnetic device for engaging or disengage a plunger with or from a gear fixed to the shaft in order to determine the stop position of the mirror body.

3. Discussion of the Prior Art

In the above-mentioned structure of the prior art mechanism, however, there exist various problems such that a great space is inevitably required because the reduction gear and the mirror positioning electromagnetic device should be arranged in a mirror rotation plane, and therefore the external decorative design of the fender mirror is restricted or the projection area of the mirror which exerts a harmful influence upon the air dynamics characteristics of the vehicle is inevitably increased.

Further, in this prior art mirror adjusting mechanism, since the relatively heavy reduction gear and the electromagnetic device are arranged at positions remote from the pivotal center of the mirror body, there exists another problem in that vibrations of the mirror body is intensified by vibrations of the running vehicle and therefore it is difficult to obtain a stable rear view through the fender mirror. To overcome the mirror vibration, it is possible to increase the frictional force between a bottom cover of the mirror body and the post by urging the spring washer through the shaft. In this case, however, other problems may arise such that a motor of a higher power or a reduction gear of a higher gear reduction ratio should be incorporated in the mechanism.

Further, this prior art mirror adjusting mechanism is provided with a shock damping function such that the mirror body is rotatable about the shaft in case a shock is applied to the mirror body, for instance, as when a human body hits against the mirror body. In this case, however, since the output gear is inevitably rotated, a shock applied to the mirror is transmitted to the reduction gear. Even if this impact force is small, since the rotative speed is reduced at a high reduction ratio from the motor to the output gear, a very strong impact force is applied to each gear due to the inertia of the motor and the frictional force of each gear bearing portion. Therefore, a large strength against a small impact force is required for the mechanism itself. Further, when the above shock damping function is required from the mirror body to the motor within the mechanism, the reduction gear should be constructed by only spur gears. In other words, it is difficult to utilize a worm mechanism with a high gear reduction ratio in spite of a simple structure for the mirror adjusting device.

SUMMARY OF THE INVENTION

With these problems in mind, therefore, it is a primary object of the present invention to provide a novel angular position adjusting device provided with a gear mechanism of high gear reduction ratio and a sufficient shock damping function.

It is a further object of the present invention to provide a novel angular position adjusting device which further satisfies the above-mentioned various other requirements.

To achieve the above-mentioned object, the angular position adjusting device of a first aspect according to the present invention is basically characterized in that (1) a planetary gear mechanism intervenes between a fixed member and a movable member rotatably arranged relative to said fixed member in such a way that the relative gear engagement position between an inner gear and an outer gear of said planetary gear mechanism is changeable when any one of the inner gear and outer gear is eccentrically rotated by an eccentrically rotatable member; (2) said planetary gear mechanism is in engagement with one of said fixed member and said movable member; and (3) torque limiting coupling means intervenes between said planetary gear mechanism and the other of said fixed member and said movable member.

Further, in a second aspect according to the present invention, the angular position adjusting device is further characterized in that a motor (driving means) for rotating the eccentrically rotatable member is mounted on any one of the movable and fixed members based on the first aspect of the present invention.

The planetary gear mechanism is so constructed that an inner gear and an outer gear, each having the number of teeth different from each other, are geared with each other, and any one of the two gears is eccentrically rotated by an eccentrically rotatable member to produce a phase angle difference between the two gears according to the difference in the number of teeth between the two gears whenever the eccentrically rotatable member rotates one revolution eccentrically.

This phase angle difference is given to the movable member directly or indirectly through torque limiting coupling means (e.g., frictional engagement means or ball-notch means). The torque limiting coupling means has such a shock damping function as to rotate the movable member in the direction that a shock is applied to the movable member.

In particular, in the second aspect of the present invention in which the phase angle difference is indirectly given to the movable member through the torque limiting coupling means, the motor is mounted on the fixed member. Further, when the phase angle difference is directly given to the movable member, the motor is mounted on the movable member. Therefore, in both the aspects, shock is not applied to the motor if the damping function is operative. Therefore, in the second aspect of the present invention, it is possible to utilize a worm mechanism including a worm gear and a worm wheel as means for transmitting a relative force from the motor to the eccentrically rotatable member at a high speed reduction ratio.

Preferred embodiments of the present invention are generally described in the subclaims herein attached and herein incorporated by reference thereto. Summary thereof will be set forth hereinbelow.

In the first and second aspects of the present invention, there exist two different modifications as follows: In the first modification, the torque limiting coupling means intervenes between the planetary gear mechanism and the fixed member, and the movable member constitutes a part (gear) of the planetary gear mechanism. In the second modification, the torque limiting coupling means intervenes between the planetary gear mechanism and the movable member, and the fixed member constitutes a part (gear) of the planetary gear mechanism. Furthermore, the first modification can be divided into two submodifications in dependence upon whether the movable member constituting the planetary gear mechanism is formed as an inner gear or an outer gear. Similarly, the second modification can be divided into two submodifications in dependence upon whether the fixed member is formed as an inner gear or an outer gear. Further, the eccentrically rotatable member of the planetary gear mechanism is not necessarily a single body in the above modifications. An eccentric ring or pipe rotatable about a fixed shaft, for instance, can be used as the eccentrically rotatable member.

Further, in another modification in which the movable member constitutes a part of the planetary gear mechanism, it is also possible to construct the device in such a way that a gear (second intermediate member) is additionally provided so as to be engageable with the movable member and eccentrically rotatable by the eccentrically rotatable member, and only the rotational movement of the above gear is transmitted to the movable member without transmitting the eccentric movement of the gear to the movable member.

Furthermore, in a further modification, it is also possible to construct a two-stage planetary gear mecahnism such that one gear constituting the planetary gear mecahnism is intermeshed in common with a gear (second intermediate member) and one of the fixed member or the movable member.

Further, in the second aspect of the present invention, in particular, there are two modifications, one being such that the movable member constitutes a part of the planetary gear member, and the motor is mounted on the movable member, and the other being such that the torque limiting coupling means intervenes between the planetary gear mechanism and the movable member, the fixed member is formed with a part of the planetary gear mechanism, and the motor is mounted on the fixed member.

When the eccentrically rotatable member is driven by the motor, an eccentrically rotatable gear loosely fitted to this eccentrically rotatable member eccentrically rotates to change the gear engagement position between this eccentrically rotatable gear and another gear in mesh therewith. Whenever the gear engagement position changes, the movable member eccentrically rotates in some modifications or changes the angular position relative to the fixed member without eccentrical oscillation in some other modifications. One revolution of the eccentrically rotatable member causes a phase angle difference corresponding to a difference in the number of teeth between the inner gear and the outer gear in the movable member and the fixed member. Therefore, if the number of teeth is large in the inner and outer gears and the difference in the number of teeth between the two is one, a maximum gear reduction ratio can be obtained. When the movable member is formed with a part of the planetary gear mechanism, the phase angle difference caused between the inner gear and the outer gear by the eccentrically rotational motion is directly transmitted, when the movable member is coupled to the torque limiting coupling means without direct relationship with respect to the planetary gear mechanism, the phase angle difference is transmitted to the movable member via the torque limiting coupling means. Therefore, when the eccentrically rotatable member is appropriately rotated by the motor, it is possible to locate the movable member at a desired angular position relative to the fixed member. In the normal operation which determines the angular position of the movable member, the torque limiting coupling means functions so as to combine two elements as a single body.

Further, the torque limiting coupling means is provided with an additional shock damping function such that when a shock is applied to the movable member, the movable member is allowed to rotate in the direction that the shock is applied. In the modification in which the torque limiting coupling means intervenes between the movable member and the planetary gear mechanism, only the movable member is allowed to rotate. At this moment, in the second aspect of the present invention, the eccentrically rotatable member and the planetary gear mechanism are retained at the present positions. In contrast with this, in the modification in which the torque limiting coupling means intervenes between the fixed member and the planetary gear mechanism, the movable member and the planetary gear mechanism are allowed to rotate together. At this moment, in the second aspect of the present invention, the movable member rotates in unison with the motor. The degree of impact force to be damped is determined on the basis of a torque limiting (or frictional) force generated by urging the torque limiting coupling means. Therefore, it is possible to adjust the threshold, beyond which the movable member is rotated by a shock, by adjusting the force which urges the torque limiting coupling means.

The device according to the present invention has the following various advantages. In case the movable member is operated suddenly by manual operation or by a shock, since the eccentrically rotatable shaft or the eccentrically rotatable ring or pipe are arranged in integral or fixed relationship with respect to the movable member or the fixed member, it is possible to adopt a worm mechanism of high gear reduction ratio which includes a worm gear and a worm wheel. Therefore, the number of necessary parts can be reduced; the size and the weight are minimized; and further since an impact force is not applied to the gear speed reduction mechanism per se, the reliability of the motor and the related mechanism is improved without using a high cost material.

With respect to a back mirror (door mirror, fender mirror or the like) angular position adjusting mechanism for an automotive vehicle to which the angular position adjusting device according to the present invention is applied by way of example, when the mirror body of the mirror frame is declined manually, the intermediate member rotates relative to the mirror base. However, when the mirror body is returned to its neutral position by the motor, it is unncessary to fixedly determine the positional relationship between the intermediate member and the mirror base in accordance with a predetermined relationship, so that the structure can be simplified.

Further, in the case of the prior art back mirror mechanism, it has been necessary to strongly urge the frame against the mirror base for prevention of the mirror from vibration. Therefore, a large force has been required to change the angular position of the mirror by a motor. In the case of the angular position adjusting device according to the present invention, only a small motor torque is required.

Furthermore, in the device according to the present invention, a shock damping function is additionally provided for the planetary gear mechanism without damaging the features of the planetary gear mechanism, and therefore the planetary gear mechanism is more effectively utilized as compared with the conventional device or mechanism.

DESCRIPTION OF THE PREFERRED EMBODIMENTS

Figure 1:
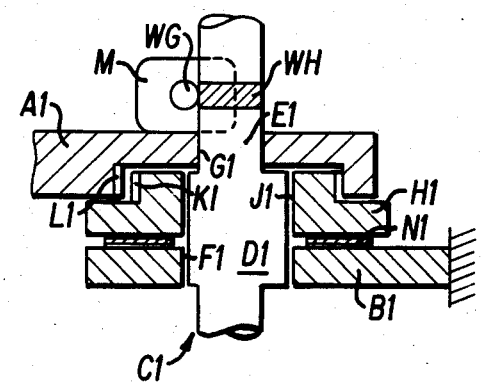
FIGS. 1 to 14 are cross-sectional views showing the angular position adjusting devices of various different embodiments of the present invention.

The embodiments of the present invention will be described hereinbelow with reference to the attached drawings. Each of FIGS. 1 to 14 is a cross-sectional view showing the basic structure of various embodiments of the present invention. Among these, FIG. 1 shows an embodiment in which the movable member is constructed by a planetary gear mechanism.

A movable member A1 is disposed a distance away from a fixed member B1 fixed to or supported by an object in parallel positional relationship between the two. Further, both the movable and fixed members A1 and B1 are connected to each other via an eccentrically rotatable member C1. The eccentrically rotatable member C1 is formed with the steps of a large-diameter portion D1 and a small-diameter portion E1 in eccentric relationship between the two axial lines thereof. The large-diameter portion D1 is rotatably fitted to a hole F1 formed on the fixed member B1, and the small-diameter portion E1 is rotatably fitted to a hole G1 formed on the movable member A1. Therefore, the movable member A1 is eccentrically rotatable relative to the fixed member B1 in a plane parallel to the fixed member B1.

Between these two members A1 and B1, an intermediate member H1 constituting a planetary gear mechanism intervenes. The large-diameter portion D1 of the eccentrically rotatable member C1 is rotatably passed through a central hole J1 formed on the intermediate member H1, and an outer gear K1 is formed at the outer periphery of an axially convex portion of the intermediate member H1 so as to face the inner surface of the movable member A1. An inner gear L1 is formed at the inner periphery of an axially concave portion of the movable member A1 in relation to the outer gear K1 in such a way as to be brought into engagement with the outer gear K1 at one side but separated from the outer gear K1 at the other side according to the eccentric diameter of the eccentrically rotatable member C1. The number of teeth of the gear K1 or L1 is different from each other, and if the difference between the two is one, the gear reduction ratio becomes its maximum in the planetary gear mechanism.

To provide a shock damping function, a friction plate N1 serving as torque limiting coupling means intervenes between the intermediate member H1 and the fixed member B1. This friction plate N1 is in pressure contact with the inner surface of the fixed member B1 by appropriate urging means (not shown) through the intermediate member H1, so that a frictional force is generated between the intermediate member H1 and the fixed member B1 to unrotatably support the intermediate member H1 on the fixed member B1. It is necessary to determine this frictional force to be greater than a rotative force generated when the eccentrically rotatable member C1 is rotated with the hole F1 formed on the fixed member B1 as its center in order to adjust the angular position of the movable member A1. Therefore, a minimum urging force should be applied to the friction plate N1 so as to generate a frictional force as described above. When this urging force is increased, a shock to be damped becomes great. In the case where a motor is used to rotate the eccentrically rotatable member C1, the motor M is mounted on the movable member A1. The motor M is connected to the eccentrically rotatable member C1 via a worm mechanism. The worm mechanism is composed of a worm gear WG formed integral with the driving shaft of the motor M and a worm wheel WH formed integral with the eccentrically rotatable member C1 in order to reduce the rotative speed of the motor M and transmit the rotative force of the motor M to the eccentrically rotatable member C1.

The operation of this mechanism will be described hereinbelow.

To adjust the angular position of the movable member A1, the eccentrically rotatable member C1 is rotated manually or by a motor in any given direction. In the case of the motor, the motor M is driven in a given direction to transmit the rotation of the motor M to the eccentrically rotatable member C1 through the worm mechanism WG, WH. Since the large-diameter portion D1 of the eccentrically rotatable member C1 rotates in the central hole F1 of the fixed member B1, the small-diameter portion E1 rotatably fitted to hole G1 of the movable member A1 rotates eccentrically. This eccentric rotation causes the movable member A1 to rotate (together with the motor M when mounted) in a plane parallel to the fixed member B1, and therefore the engagement position between the inner gear L1 of the movable member A1 and the outer gear K1 of the intermediate member H1 unrotatably supported on the fixed member B1 by the aid of the friction plate N1 changes continuously.

Since the number of teeth of the outer gear K1 is different from that of the inner gear L1, when the eccentrically rotatable member C1 rotates once, the movable member A1 rotates to an angular position corresponding to the difference in the number of teeth between the two gears K1 and L1.

In case the difference in the number of teeth between the two is one, the movable member A1 rotates to an angular position corresponding to one tooth pitch whenever the eccentrically rotatable member C rotates once, so that it is possible to obtain a high gear reduction ratio. This high gear reduction ratio permits the angular position of the movable member to be adjustable finely and accurately. As described above, the oscillation movement of the eccentrically rotatable member C1 rotates the movable member A1 to a desired angular position thereof.

Thereafter, in case a shock beyond the frictional force of the friction plate N1 is applied to the movable member A1 for some reason or other, the movable member A1, the intermediate member H1 and the eccentrically rotatable member C1 all rotate together with the hole F1 of the fixed member B1 as their center in the direction that the shock is applied, in dependence upon the mutual positional relationship between the eccentric eccentrically rotatable member C1 and both the in-engagement gears K1 and L1. At this moment, since the motor M rotates together with the eccentrically rotatable member C1, the engagement relationship between the worm gear WG and the worm wheel WH formed in the eccentrically rotatable member C1 is retained unchanged without being subjected to a harmful influence of the shock applied to the movable member. Further, in this case, the intermediate member H1 slips relative to the fixed member B1 via the friction plate N1 to damp an impact force applied to the movable member A1. The slipped movable member A1, the eccentrically rotatable member C1 and the intermediate member H1 are all returned to their positions by an elastic force of a spring (not shown) after the impact force has been released.

Figure 2:
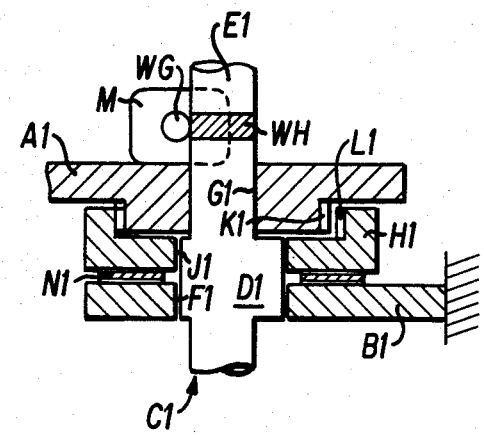

FIG. 2 shows a modification of the basic embodiment shown in FIG. 1, in which the arrangement of the inner gear and the outer gear constituting a planetary gear mechanism is modified. In FIG. 2, the same reference symbols have been retained for the similar parts which have the same functions without repeating the description thereof.

As is well understood by the drawing, in this embodiment, the inner gear L1 is formed on the intermediate member H1 and the outer gear K1 is formed on the movable member A1. The operation of this modification is substantialy the same as in the case with the embodiment previously described with reference to FIG. 1 and any detailed description thereof is believed to be unnecessary.

Figure 3:
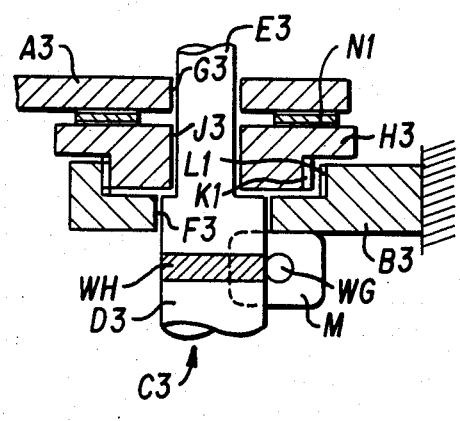

FIG. 3 is further another modification. The friction plate N1 intervenes between the movable member A3 and the intermediate member H3, and both are members A3 and H3 are eccentrically rotatably supported by the eccentrically rotatable member C3 relative to the fixed member B3. The large-diameter portion D3 of the eccentrically rotatable member C3 is rotatably fitted to a hole F3 of the fixed member B3, and the small-diameter portion E3 eccentric relative to the large-diameter portion D3 is rotatably fitted to a hole G3 of the movable member A3 and a hole J3 of the intermediate member H3. The planetary gear mechanism is composed of the outer gear K1 formed on the intermediate member H3 and the inner gear L1 formed on the fixed member B3.

Where a motor is used, the motor M is mounted on the fixed member B3, and a worm mechanism is arranged between the motor M and the large-diameter portion D3 of the eccentrically rotatable member C3. The worm mechanism includes a worm gear WG disposed on the motor M side and a worm wheel WH disposed on the large-diameter portion D3 side.

The operation of this embodiment shown in FIG. 3 will be described hereinbelow. In the case where the device is driven by the motor M, the eccentrically rotatable member C3 rotates at a low rotative speed reduced by the worm mechanism WG, WH. The large-diameter portion D3 of the eccentrically rotatable member C3 rotates with the hole F3 of the fixed member B3 as its center, and thus the small-diameter portion E3 also rotates. Owing to this eccentrically rotational movement, the intermediate member H3 and the movable member A3 eccentrically rotate in a plane parallel to the fixed member B3, so that the engagement position of the outer gear K1 with the inner gear L1 changes continuously.

The intermediate number H3 is rotated by the rotation of the eccentrically rotatable member C3 according to the difference in the number of teeth between the outer and inner gears K1 and L1, and transmitted to the movable member A3 through the friction plate N1. Therefore, the movable member A3 is adjusted to a desired angular position. In this embodiment, in case a shock is applied to the movable member A3, only the movable member A3 rotates about the small-diameter portion E3 of the eccentrically rotatable member C3 to damp an impact force. The engagement relationship between the worm gear WG and the worm wheel WH disposed between the motor M and the eccentrically rotatable member C3 is kept at the initial condition without being subjected to an impact force.

Figure 4:
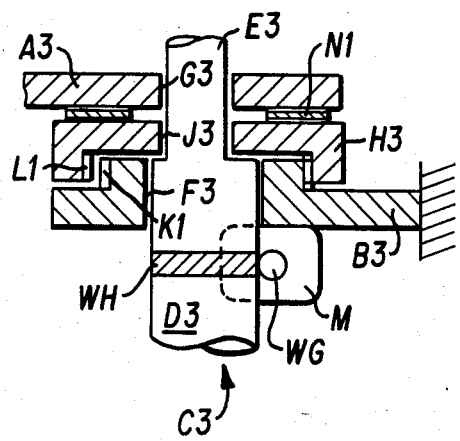

FIG. 4 shows another modification of the embodiment shown in FIG. 3, in which the arrangement of the inner gear and the outer gear constituting the planetary gear mechanism is modified. In this embodiment, the inner gear L1 is formed on the intermediate member H3, while the outer gear K1 is formed on the fixed member B3. The other structure is quite the same as that of the embodiment shown in FIG. 3. Further, the operation of this embodiment is the same as that of the embodiment shown in FIG. 3, therefore the description thereof being omitted herein.

Figure 5:
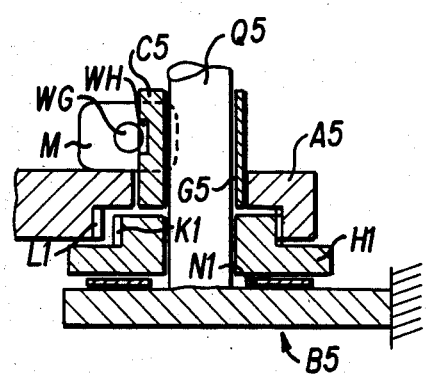

FIG. 5 shows another modification, in which the eccentrically rotatable member shown in FIG. 1 is modified to an eccentric ring rotating about a fixed shaft. The eccentric ring C5 is rotatably fitted to a fixed shaft Q5 fixed to a fixed member B and further rotatably passed through a hole G5 formed on a movable member A5. The worm mechanism WG, WH is disposed between the motor M mounted on the movable member A5 and the eccentric ring C5. The other construction is the same as that of the embodiment shown in FIG. 1. The angular position of the movable member A5 can be adjusted by rotating the eccentric ring C5 manually or by a motor. In the case where a motor is used, the motor rotates the eccentric ring C5 about the fixed shaft Q5 through the worm mechanism WG, WH.

In case a shock is applied to the movable member A5, the eccentric ring C5 and the intermediate member H1 are rotated against the frictional force generated by the friction plate N1 together with the movable member A5 on which the motor M is mounted.

Figure 6:
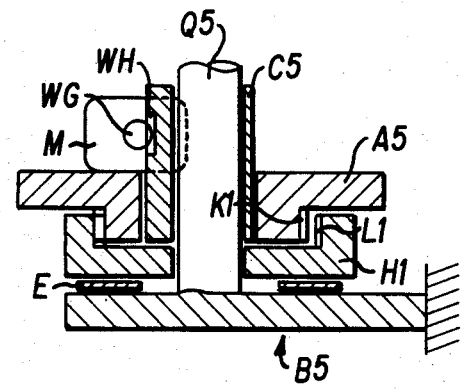

FIG. 6 shows a modification corresponding to the one shown in FIG. 2, in which the arrangement of the inner gear and the outer gear is modified in the embodiment shown in FIG. 5. In this embodiment, the inner gear L1 is formed on the intermediate member H1, while the outer gear K1 is formed on the movable member A5. The other structure is the same as that of the embodiment shown in FIG. 5. Further, the operation of this embodiment is the same as that of the embodiment shown in FIG. 5, the description thereof being therefore omitted herein.

Figure 7:
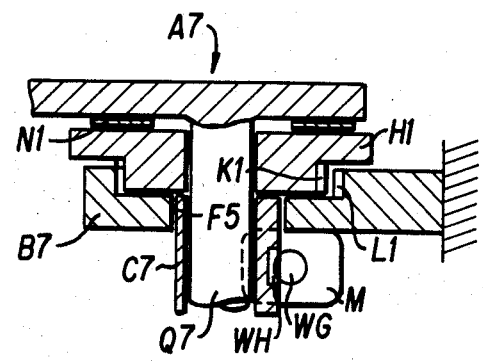

FIG. 7 shows a modification of the embodiment shown in FIG. 3, in which the eccentric portion of the eccentrically rotatable member is replaced with an eccentric ring. The eccentric ring C7 is rotatably fitted to a shaft Q7 fixed to a movable member A7 and also rotatably passed through a hole F5 formed on the fixed member B7. The worm mechanism WG, WH is disposed between the motor M mounted on a fixed member B7 and the eccentric ring C7. The other structure is the same as that of the embodiment shown in FIG. 3. For angular adjustment, the eccentric ring C7 is rotated about the shaft Q7 of the movable member A7 manually or by the motor M.

In case a shock is applied to the movable member A7, only the movable member A7 rotates in a central hole formed on the eccentric ring C7 to damp an impact force.

Figure 8:
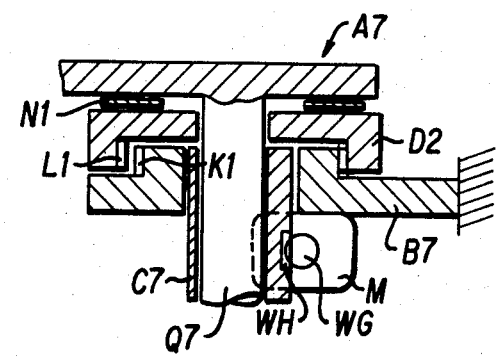

FIG. 8 shows an modification corresponding to the one shown in FIG. 4, in which the arrangement of the inner gear and the outer gear is modified in the embodiment shown in FIG. 7. In this embodiment, the inner gear L1 is formed on the intermediate member H1 and the outer gear K1 is formed on the fixed member B7. The other structure in the same as that shown in FIG. 7. The operation of the embodiment is also the same as that of the embodiment shown in FIG. 7, therefore the description thereof being omitted herein.

Figure 9:
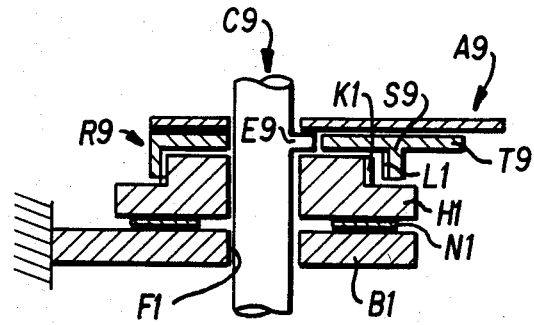

FIG. 9 is an embodiment corresponding to the one shown in FIG. 1. In this embodiment, the movable member is so constructed as to rotate in a predetermined relationship with respect to the planetary gear mechanism. Therefore, the movable member will not eccentrically rotate in angular adjustment.

The planetary gear mechanism is eccentrically rotated by the intermediate member H1, and an eccentric portion E9 of the eccentrically rotatable member C9. The device is further composed of a second intermediate member R9 related to the movable member A9. The outer gear K1 is formed on the intermediate member H1 and the inner gear L1 is formed on the second intermediate member R9. This second intermediate member R9 is formed with a slot T9 engageable with a projection S9 formed on the movable member A9 in the circumferential direction thereof in order to only rotate the movable member A9. This slot T9 extends in the radial direction of the second intermediate member R9 and has such an extent of length as to exceed the eccentric distance. The motor M is mounted on the movable member A9 and the worm mechanism WG, WH intervenes between the motor M and the eccentrically rotatable member C9. The other structure is the same as that of the embodiment shown in FIG. 1. For angular adjustment of the movable member A9, the eccentrically rotatable member C9 is rotated with a hole F1 formed on the fixed member B1 as its center manually or by the motor M. By this, the second intermediate member R9 eccentrically rotates relatively to the intermediate member H1 by means of the eccentric portion E9 formed on the eccentrically rotatable member C9. At this moment, the slot T9 engageable with the projection S9 of the movable member A9 in the circumferential direction thereof moves in the radial direction thereof without moving the movable member A9.

By the eccentric rotational motion of the second intermediate member R9, the position of engagement between the inner gear L1 and the outer gear K1 changes continuously. Since the number of teeth is different between the two gears L1 and K1, whenever the engagement position changes, the second intermediate member R9 rotates about the intermediate member H1. The rotation produced by the second intermediate member R9 is transmitted to the projection S9 through the slot T9 to rotate the movable member A9. Owing to such transmission means as described above, the movable member A9 is adjusted to a desired angular position on the basis of an appropriate rotation of the eccentrically rotatable member C9.

Thereafter, in case a shock is applied to the movable member A9, an impact force in transmitted to the second intermediate member R9 through the projection S9 and the slot T9 engageable with the projection S9, and further to the intermediate member H1 through both the gears K1 and L1. When the impact force exceeds the frictional force generated by the friction plate N1, the movable member A9 rotates about the hole F1 of the fixed member B1 together with the intermediate member H1 and further with the eccentrically rotatable member C9 to damp the applied impact force. At this moment, no shock is applied to the worm mechanism WG, WH, so that the normal engagement relationship between the two is retained at the initial condition.

Figure 10:
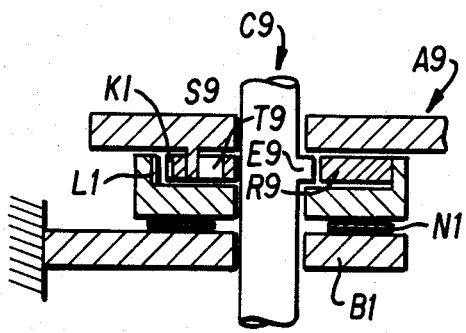

FIG. 10 shows the embodiment corresponding to the one shown in FIG. 2, in which the arrangement of the inner gear and the outer gear is modified in the embodiment shown in FIG. 9. The inner gear L1 is formed on the intermediate member H1. The other structure is the same as that of the embodiment shown in FIG. 9 and the operation thereof is also the same as in FIG. 9.

Figure 11:
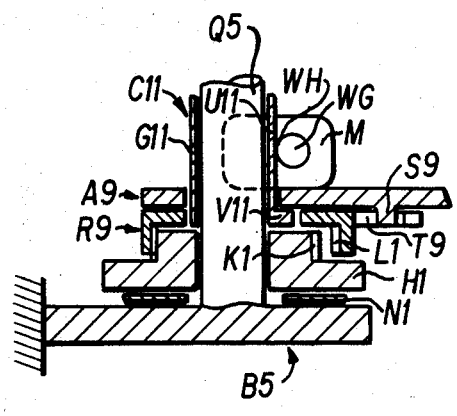

FIG. 11 shows an modification in which the eccentrically rotatable member shown in FIG. 9 is replaced with an eccentric ring. The eccentric ring C11 is made up of a right circular cylindrical portion U11 and an eccentric portion V11 formed at the lower end of the cylindrical portion U11 to eccentrically rotate the second intermediate member R9. In the same way as in FIG. 5, the cylindrical portion U11 is rotatably fitted to the fixed shaft Q5 fixed to the fixed member B5 and also rotatably passed through a hole G11 formed on the movable member A9. The worm mechanism WG, WH is disposed between the motor mounted on the movable member A9 and the cylindrical portion U11 of the eccentric ring C11. The other structure is the same as that of the embodiment shown in FIG. 5. Further, the operation thereof is almost the same as in FIG. 5. However, in the same way as in FIG. 9, the movable member A9 will not eccentrically rotate in adjusting the angular position of the movable member.

Figure 12:
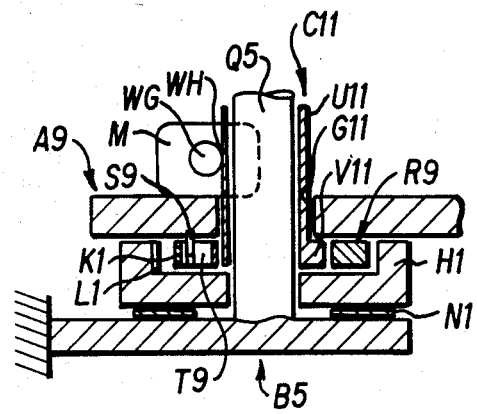

It is also possible to construct the embodiment shown in FIG. 11 in such a way as to change the arrangement of the inner gear and the outer gear as shown in FIG. 12.

Figure 13:
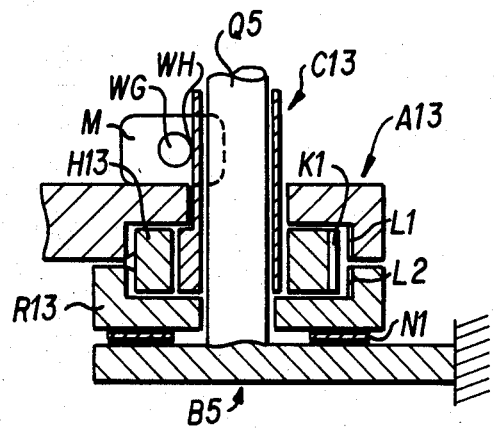

FIG. 13 shows a modification in which the planetary gear mechanism is formed by two stages to allow only the movable member to be rotatable. It is possible to consider that this embodiment is a modification corresponding to that shown in FIG. 5 or 6.

In the same way as in FIG. 5, the fixed member B5 is formed with a fixed shaft Q5 connectable with the movable member A13. An eccentric ring C13 of the same structure as that of the embodiment shown in FIG. 12 is rotatably fitted to the fixed shaft Q5 to eccentrically rotate the second intermediate member H13. On the upper and lower sides of the second intermediate member H13, a movable member A13 and an intermediate member R13 are arranged in parallel relationship to each other so as to be rotatable about the fixed shaft Q5.

The planetary gear mechanism is disposed between the movable member A13 and the intermediate member R13 with the second intermediate member H13 connectable in common with the two members A13 and R13. In this embodiment, the outer gear K1 is formed on the second intermediate member H13, while two inner gears L1 and L2 are formed separately in both the movable member A13 and the intermediate member R13. The necessary condition that the movable member A13 is rotatable is that the numbers of teeth of at least two inner gears L1 and L2 should be different from each other.

A friction plate N1 intervenes between the intermediate member R13 and the fixed member B5 to provide a dampling function between there two members R13 and B5.

The motor M is mounted on the movable member A13 and operatively connected to the eccentric ring C13 through the worm mechanism WG, WH.

To describe the operation of this embodiment, the assumption is made that the number of teeth of the outer gear K1 is equal to that of the inner gear L2 of the intermediate member R13 but different from that of the inner gear L1 of the movable member A13. Under these conditions, this embodiment operates in the same way as that shown in FIG. 5. However, the difference between the two is that in this embodiment, the movable member A13 will not eccentrically rotate because only the second intermediate member H13 is eccentrically rotated by the eccentric ring C13.

In contract with this, the assumption is made that the number of teeth of the outer gear K1 is equal to that of the inner gear L1 of the movable member A13 but different from that of the inner gear L2 of the intermediate member R13. Under these conditions, this embodiment operates in the same way as that shown in FIG. 6. However, the difference between the two is that the movable member A13 will not eccentrically rotate.

Further, when all the numbers of teeth of gears K1, L1, and L2 are different from each other, a rotational difference corresponding to the difference in the number of teeth between both the gears L1 and L2 will be produced between the movable member A13 and the fixed member B5.

In case a shock is applied to the movable member A13, the second intermediate member H13, the intermediate member R13, and further the eccentric ring C13 are all rotated together with the movable member A13 about the fixed shaft Q5 of the fixed member B5. In this case, the eccentric ring C13 rotates together with the movable member A13, so that no impact force is applied to the worm mechanism WG, WH.

In the embodiment shown in FIG. 13, the outer gear is formed on the second intermediate member H13. However, as shown in FIG. 14, it is also possible to construct the device in such a way that the second intermediate member H14 is formed with two inner gears L3 and L4, the movable member A14 is formed with an outer gear K3, and the intermediate member R14 is formed with an outer gear K4.

Figure 14:
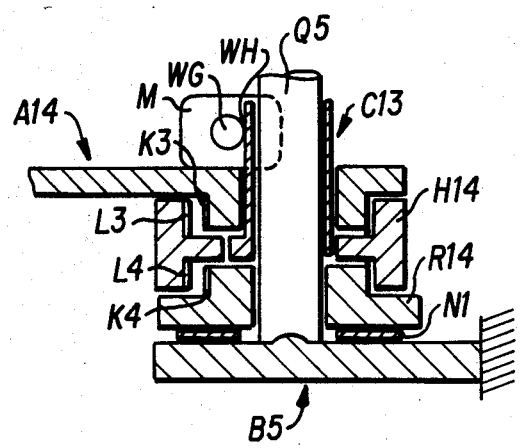

Further, in the embodiments shown in FIGS. 13 and 14, it is also possible to fix the movable member as the fixed member and to use the fixed member as the movable member. Further, claw clutch means of torque limiter coupling type can be used in place of the frictional embodiment means.

Figure 15:
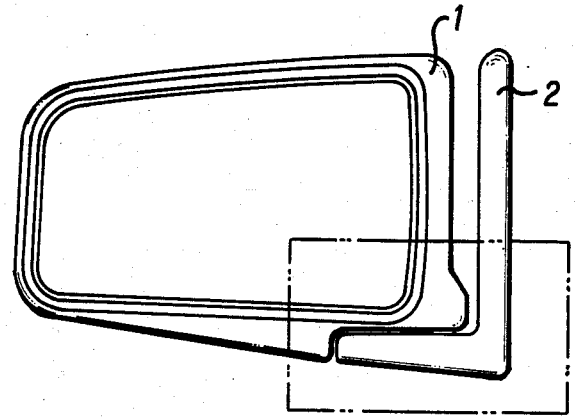
FIG. 15 is an illustration showing a door mirror angular position adjusting mechanism for an automotive vehicle to which the angular position adjusting device according to the present invention is applied.
Figure 16:
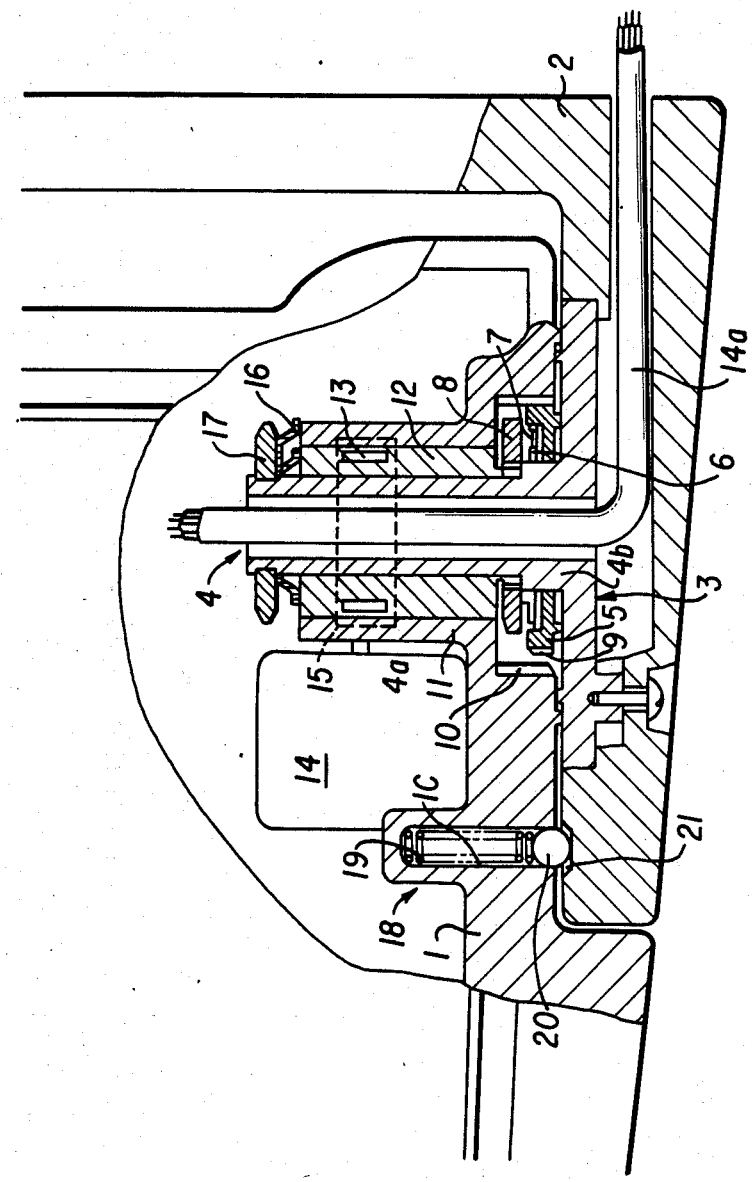
FIG. 16 is an enlarged cross-sectional view of the position enclosed by dot-dot-dashed lines shown in FIG. 15.
Figure 17:
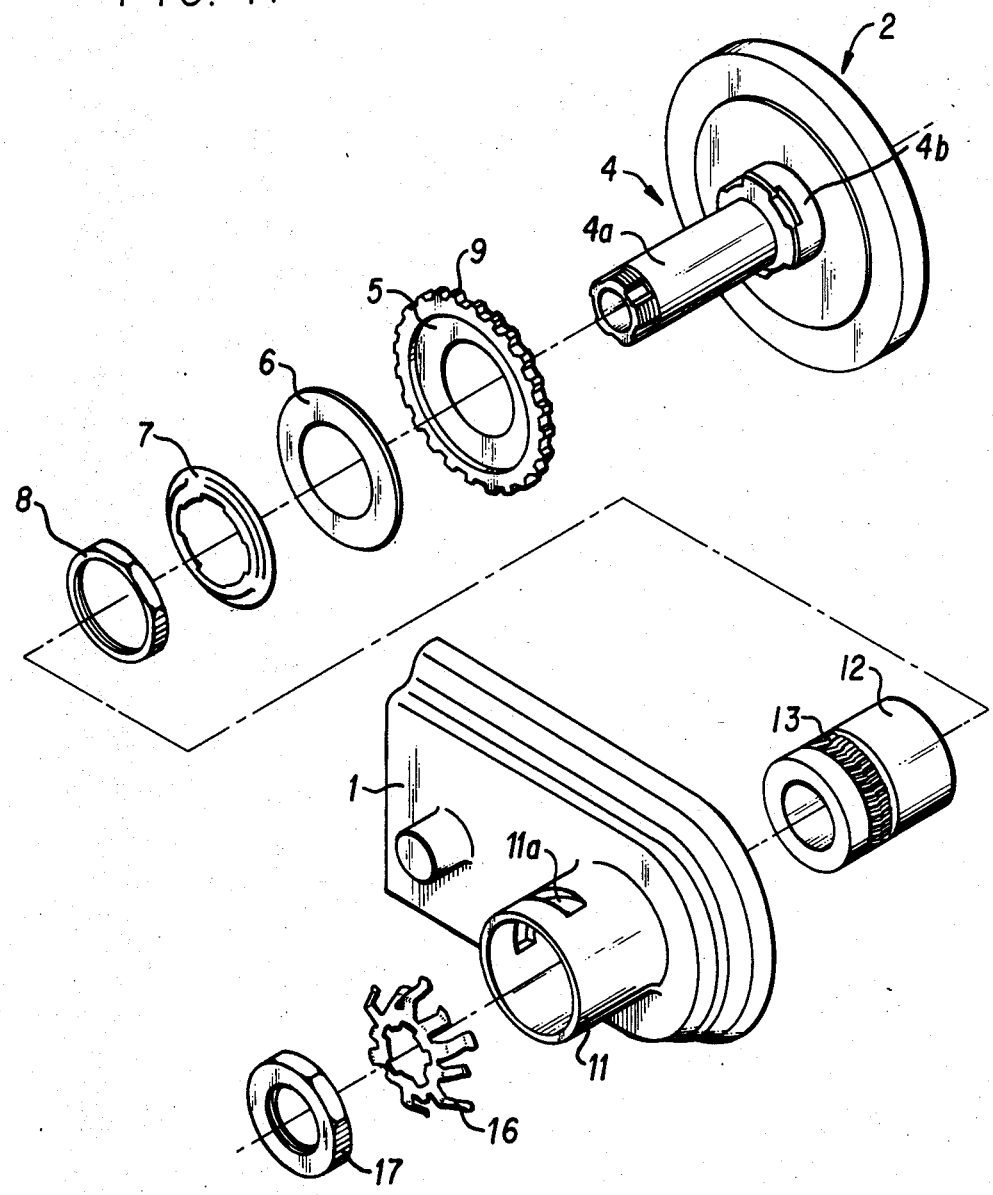
FIG. 17 is a perspective exploded view showing the essential elements shown in FIG. 16.

The angular position adjusting device of the present invention is applicable to a back mirror angular position adjustment mechanism for an automotive vehicle as shown in and after FIG. 15, for instance. FIG. 15 is a diagrammatic view showing a back mirror for an automotive vehicle. The reference numeral 1 denotes a frame corresponding to the movable member and 2 denotes a mirror base corresponding to the fixed member. FIG. 16 shows the planetary gear mechanism and the dampling structure in detail, in which the embodiment shown in FIG. 5 is adapted by way of example. A member 3 fixed to the mirror plate 2 is a hollow shaft 4. This shaft 4 is formed with a small-diameter portion 4a and a bottom large-diameter portion 4b. An intermediate member 5 is rotatably fitted to the large-diameter portion 4b. On the intermediate member 5, a friction plate 6 corresponding to the torque limiting coupling means and a cone-shaped spring 7 serving as urging means are disposed the latter above the former and fixed by a nut 8. The cone spring 7 is engaged with a slot formed in the large-diameter portion 4b via a powl formed in the spring 7. An outer gear 9 is formed on the intermediate member 5. An eccentric ring 12 for eccentrically rotating the frame 1 is rotatably fitted to the small-diameter portion 4a of the shaft 4 and passed through a bearing portion 11 of the frame 1. This eccentric ring 12 corresponds to the eccentrically rotatable member, and is formed with a worm wheel to obtain a rotational force. A motor 14 is provided with a worm gear 15 engageable with a worm wheel 13 through a slit 11a formed on the bearing portion 11, so as to obtain a desired gear reduction ratio through this worm gear 15 and the worm wheel 13. The bearing portion 11 and the eccentric ring 12 are fixed by another cone-shaped spring 16 engaged with a slit formed in the small-diameter portion 4a and by another nut 17 screwed to the same portion 4a so as not to be dropped off from the shaft 4. The above structure can better be understood with reference to an exploded view of FIG. 17.

Further, a notch mechanism for allowing the operator to notice the neutral mirror position is attached to this back mirror. This notch mechanism 18 is composed of a coil spring 10 inserted into a deep hole formed in the frame 1, a steel ball 20, and a shallow hole 21 bored in the mirror base 2.

The operation of the above-mentioned mechanism will be described. When the motor 14 is driven to adjust the mirror angular position, a motor speed is reduced through the worm gear 15 and the worm wheel 13, and a rotative force is transmitted to the eccentric ring 12. Therefore, the eccentric ring 12 rotates about the small-diameter portion 4a of the shaft 4 to eccentrically rotate the frame 1 together with the bearing portion 11. When the frame 1 eccentrically rotates, the engagement position between the inner gear 10 and the outer gear 9 changes, so that a phase angle is produced between the frame 1 and the mirror base 2. The motor 14 is stopped from rotation when a desired angular position of the mirror base 2 corresponding to the above phase angle has been obtained.

In case a shock is applied to the frame 1 and therefore the friction plate 6 slides, the frame 1 and the eccentric ring 12 rotate together to damp an impact force. Of course, the motor 14 mounted on the frame 1 rotates in the same direction and the normal engagement relationship is retained between the worm gear 15 and the worm wheel 13. If necessary, the mirror can be returned to the neutral position by driving the motor 14. Further, it is possible to stop the motor at the neutral position by mounting a locating limit switch between the frame 1 and the mirror base 2.

Figure 18:
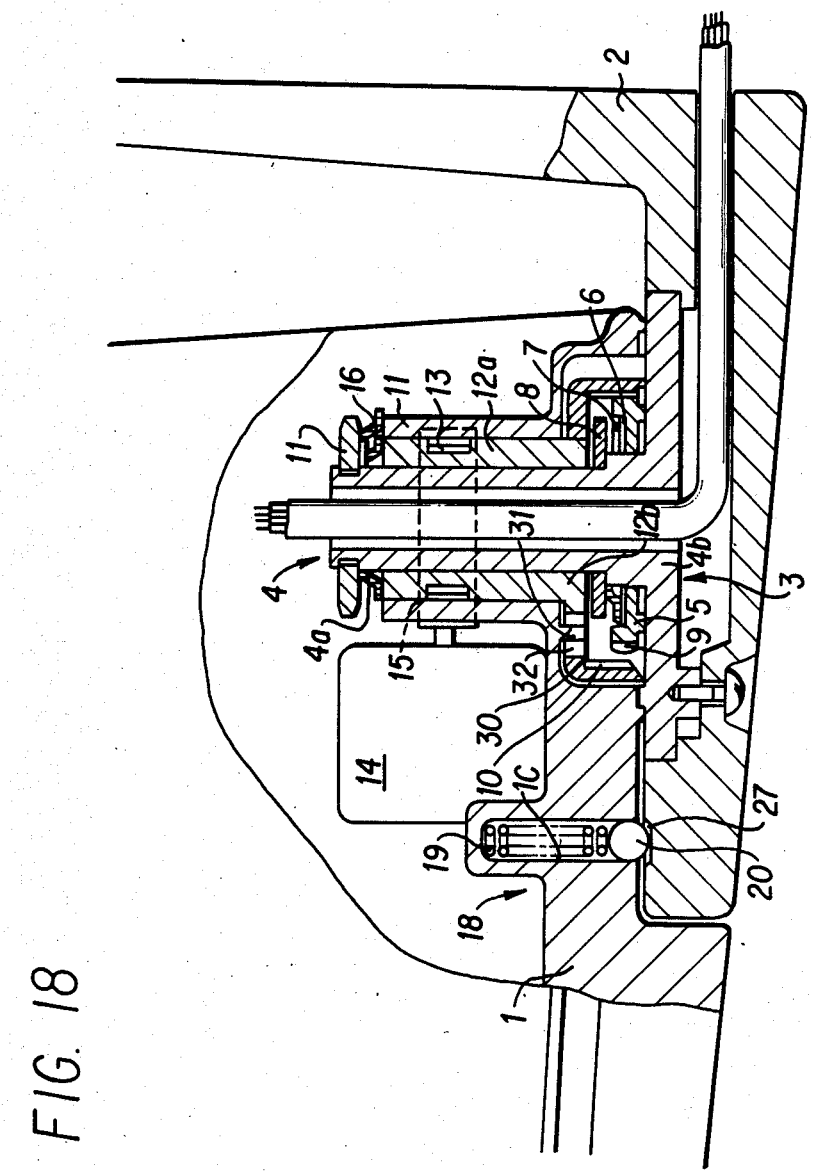
FIGS. 18 to 20 are enlarged cross-sectional views showing various back mirror angular position adjusting mechanisms for an automotive vehicle to which various embodiments of the present invention are applied.

FIG. 18 shows a back mirror angular position adjusting mechanism for an automotive vehicle to which the embodiment shown in FIG. 11 is applied. An eccentric ring 12a is rotatably fitted to the small-diameter portion 4a of the shaft 4 and passed through the bearing portion 11 of the frame 1. The eccentric ring 12a is formed with an eccentric portion 12b at the lower end thereof to eccentrically rotate a second intermediate member 30. The second intermediate member 30 is formed with a slot 32 engageable with a projection 31 of the frame 1 in the circumferential direction thereof in order to only rotate the frame 1. The slot 32 extends beyond the eccentric distance in the radial direction of the second intermediate member 30 so as not to be engaged with the projection 31.

The planetary gear mechanism is composed of a second intermediate member 30 and an intermediate member 5 fitted to the large-diameter portion 4b of the shaft 4. The second intermediate member 30 is formed with the inner gear 10 and the intermediate member 5 is formed with the outer gear 9. These two gears 9 and 10 partially engage with each other. The structure other than the above is the same as that of the application example shown in FIG. 16.

The operation thereof will be described. When the motor 14 is driven to adjust the mirror angular position, the rotative speed of the motor 14 is reduced by the worm gear 15 and the worm wheel 13, and the rotative force is applied to the eccentric ring 12a. Therefore, the eccentric ring 12a rotates about the small-diameter portion 4a, so that the eccentric portion 12b formed at the bottom end of the ring 12a eccentrically rotates the second intermediate member 30 in a plane perpendicular to the shaft 4. This eccentrically rotational motion changes the engagement position between the inner gear 10 of the second intermediate member 30 and the outer gear 9 of the intermediate member 5. At this moment, the second intermediate member 30 moves both in the circumferential direction and in the radial direction. The circumferential movement is transmitted to the frame 1 through the projection 30 engageable with the slot 32 in the circumferential direction thereof, while the radial movement is not transmitted to the frame 1 because the slot 32 moves along the projection 30 in the radial direction thereof. Since the numbers of teeth of both the gears 9 and 10 are different from each other, whenever the gear engagement position changes, the frame 1 rotates about the eccentric ring 12a. When the eccentric ring 12a rotates an appropriate angle, the frame 1 is adjusted to a desired angular position.

Thereafter, in case a shock is applied to the frame, the impact force is transmitted to the eccentric ring 12a, the second intermediate member 30, and further the intermediate member 5 via the projection 31 and the slot 32 engageable with the projection 31 in the circumferential direction thereof. When the impact force exceeds the frictional force generated between the member 3 fixed to the mirror base 2 and the intermediate member 5, the frame 1, the eccentric ring 12a, the second intermediate member 30 and the intermediate member 5 rotate all together about the shaft 4 to damp the impact force applied to the frame 1. Further, the worm mechanism 13, 15 is retained at its normal engagement position.

Figure 19:
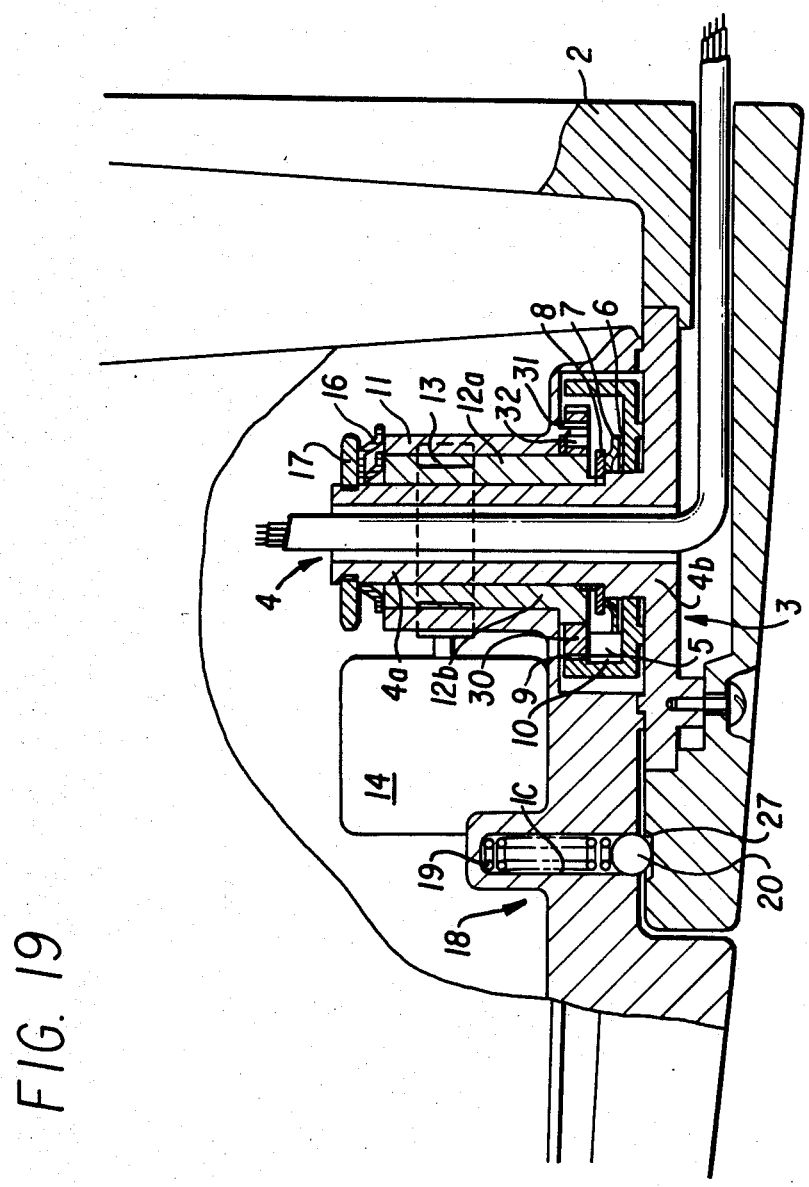

In the above back mirror angular position adjusting mechanism for an automotive vehicle, it is also possible to exchange the inner gear with the outer gear or vice versa as in the embodiment shown in FIG. 12. FIG. 19 shows an example of this application. In FIG. 19, the intermediate member 5 is formed with the inner gear 10, and the second intermediate member 30 is formed with the outer gear 9. The structure other than the above is the same as that shown in FIG. 18. Further, the operation is the same except that the outer gear 9 of the second intermediate member 30 changes the gear engagement position relative to the inner gear 10 of the intermediate member 5.

Figure 20:
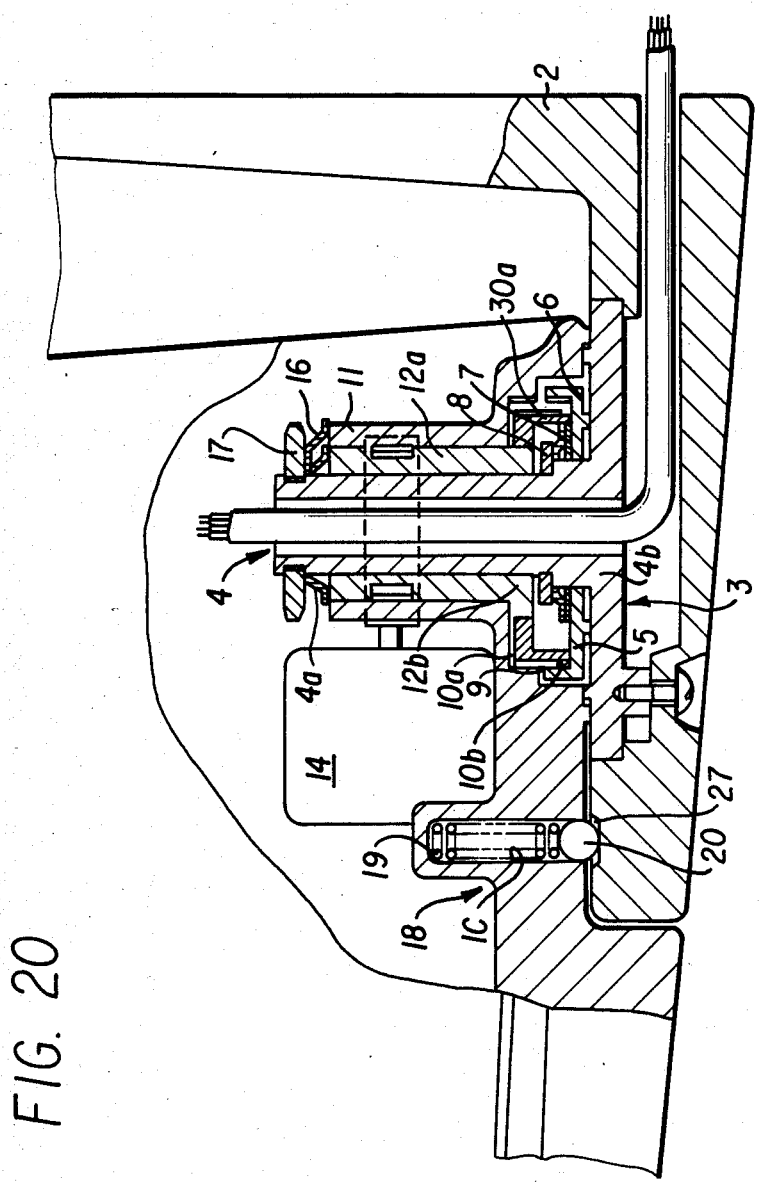

FIG. 20 shows a back mirror angular position adjusting mechanism for an automotive vehicle to which the embodiment shown in FIG. 13 is applied. The eccentric ring 12a is formed in the same way as that shown in FIGS. 18 and 19, that is, an eccentric portion 12b is formed at the bottom end of the eccentric ring 12a to eccentrically rotate the second intermediate member 30a. The second intermediate member 30 is formed with an outer gear 9 on the outer periphery thereof. An inner gear 10a in engagement with the upper part of the outer gear 9 is formed on the frame 1, and an inner gear 10b in engagement with the lower part of the outer gear 9 is formed on the intermediate member 5, separately. The number of teeth of the inner gear 10a is different from that of the other inner gear 10b. These gears 9, 10a, and 10b constitute two stages of the planetary gear mechanism.

To adjust the mirror angle, the motor 14 is driven so that the frame 1 is rotated to a desired angular position. The rotation of the motor 14 is transmitted to the eccentric ring 12a via the worm mechanism 13 and 15 in the same way as explained above. The second intermediate member 30a is eccentrically rotated by means of the eccentric portion 12b of the eccentric ring 12a, so that the gear engagement position between the outer gear 9 and the inner gear 10b of the intermediate member 5 changes continuously. The second intermediate member 30a rotates according to the difference in the number of teeth between the outer gear 9 and the inner gear 10b. Further, since the outer gear 9 is in engagement with the inner gear 10a of the frame 1, the frame 1 also rotates according to the difference in the number of teeth between the two gears 9 and 10a. As a result, the frame 1 rotates in the desired direction at a rotative speed determined according to the rotative speed of the eccentric ring 12a of the frame and in accordance with the difference in the number of teeth between the two inner gears 10a and 10b. The motor 14 is stopped the moment the frame 1 rotates to a desired angular position. In the case where a limit switch is mounted to stop the frame 1 at the neutral position, the motor 14 is stopped by this limit switch.

In case a shock is applied to the frame 1, the impact force is transmitted to the second intermediate member 30a and further the intermediate member 5 through the inner gear 10a of the frame 1 on the upper and lower sides of the outer gear 9. If the impact force exceeds the frictional force of the friction plate 6, the frame 1 rotates about the shaft 4 together with the eccentric ring 12a, the intermediate member 5 and the second intermediate member 30a. The motor mounted on the frame 1 also rotates in the same direction to keep the gear engagement relationship betweeen the worm gear 15 and the worm wheel 13 at the normal condition.

The back mirror angular position adjusting mechanisms for an automotive vehicle as shown in FIGS. 18 to 20 have an advantage such that the frame will not eccentrically rotate in the radial direction of the shaft during the angular adjusting operation.

The back mirror angular position adjusting mechanisms have been described as an example of the application of the present invention. However, without being limited to the above mechanism, the angular position adjusting device according to the present invention can be applied to all the devices or mechanisms, in which fine angular position adjusting at high reduction ratio and effective shock damping function are simultaneously required, for instance, as in back opening/closing devises on mechanisms.

What is claimed is:

1. An angular position adjusting device comprising:
   a fixed member,
   a movable member,
   an eccentrically rotatable member,
   a planetary gear mechanism having an inner gear and an outer gear, said planetary gear mechanism intervening between said fixed member and said movable member and being rotatably arranged relative to said fixed member such that the relative gear engagement position between said inner gear and said outer gear of said planetary gear mechanism is changeable when any one of the inner gear and outer gear is eccentrically rotated by said eccentrically rotatable member, said planetary gear mechanism being in engagement with one of said fixed member and said movable member; and
   torque limiting coupling means intervening between said planetary gear mechanism and the other of said fixed member and said movable member for limiting torque to said planetary gear mechanism.

2. An angular position adjusting device comprising:
   a fixed member,
   a movable member,
   an eccentrically rotatable member,
   a planetary gear mechanism having an inner gear and an outer gear, said planetary gear mechanism intervening between said fixed member and said movable member and being rotatably arranged relative to said fixed member such that the relative gear engagement position between said inner gear and said outer gear of said planetary gear mechanism is changeable when any one of the inner gear and outer gear is eccentrically rotated by said eccentrically rotatable member, said planetary gear mechanism being in engagement with one of said fixed member and said movable member;
   torque limiting coupling means intervening between said planetary gear mechanism and the other of said fixed member and said movable member for limiting torque to said planetary gear mechanism; and
   a motor for rotating said eccentrically rotatable member said motor being mounted on one of said fixed member and said movable member.

3. The angular position adjusting device as set forth in claim 1, wherein any one of said inner and outer gears constitutes an intermediate member intervening between said fixed member and said movable member, said torque limiting coupling means intervening between said intermediate member and said fixed member; and said eccentrically rotatable member being disposed so as to cause said movable member to eccentrically rotate.

4. The angular position adjusting device as set forth in claim 3, wherein said inner gear is formed on said movable member, and said outer gear is formed on said intermediate member.

5. The angular position adjusting device as set forth in claim 3, wherein said inner gear is formed on said intermediate member and said outer gear is formed on said movable member.

6. The angular position adjusting device as set forth in claim 1, wherein said torque limiting coupling means comprises frictional engagement means or a releasable intermeshing coupling.

7. The angular position adjusting device as set forth in claim 3, wherein said eccentrically rotatable member is an eccentric shaft having a large-diameter portion rotatably fitted to said fixed member and said intermediate member, and a small-diameter portion rotatably fitted to said movable member in an eccentric relationship between the large- and small-diameter portions.

8. The angular position adjusting device as set forth in claim 1, wherein a coupling force generated by said torque limiting coupling means is determined stronger than a rotative force generated when said eccentrically rotatable member eccentrically rotates any one of said inner gear and said outer gear.

9. The angular position adjusting device as set forth in claim 1, wherein any one of said inner and outer gears constitutes an intermediate member intervening between said fixed member and said movable member; said torque limiting coupling means intervenes between said intermediate member and said movable member; and said eccentrically rotatable member eccentrically rotates said intermediate member and said movable member simultaneously.

10. The angular position adjusting device as set forth in claim 9, wherein said inner gear is formed on said fixed member and said outer gear is formed on said intermediate member, respectively.

11. The angular position adjusting device as set forth in claim 9, wherein said inner gear is formed on said intermediate member, and said outer gear is formed on said fixed member.

12. The angular position adjusting device as set forth in claim 9, wherein said eccentrically rotatable member is an eccentric shaft having a large-diameter portion rotatably fitted to said fixed member and a small-diameter portion rotatably fitted to said movable member and said intermediate member in an eccentric relationship between the large- and small-diameter portions.

13. The angular position adjusting device as set forth in claim 3, wherein said eccentrically rotatable member is an eccentric ring having an inner circumferential surface rotatably fitted to a shaft fixed to said fixed member and an outer circumferential surface rotatably fitted to said movable member.

14. The angular position adjusting device as set forth in claim 9, wherein said eccentrically rotatable member is an eccentric ring having an inner circumferential surface rotatably fitted to a shaft fixed to said movable member and an outer circumferential surface rotatably fitted to said fixed member.

15. The angular position adjusting device as set forth in claim 1, wherein any one of said inner and outer gears constitutes a first intermediate member intervening between said fixed member and said movable member; the other gear constitutes a second intermediate member intervening between the first intermediate member and said movable member; said torque limiting coupling means intervenes between the first intermediate member and said fixed member; and said eccentrically rotating member eccentrically rotates said second intermediate member.

16. The angular position adjusting device as set forth in claim 15, wherein said second intermediate member is engaged with said movable member in such a way as to be integral with said movable member in a circumferential direction thereof but movable relative to said movable member in a radial direction thereof.

17. The angular position adjusting device as set forth in claim 16, wherein said movable member and said second intermediate member are engaged with each other in such a way that a projection formed on said movable member is slidably fitted to a slot formed on said second intermediate member in a radial direction thereof.

18. The angular position adjusting device as set forth in claim 15, wherein said inner gear is formed on the second intermediate member and said outer gear is formed on the first intermediate member.

19. The angular position adjusting device as set forth in claim 15, wherein said inner gear is formed on the first intermediate member and said outer gear is formed on the second intermediate member.

20. The angular position adjusting device as set forth in claim 15, wherein said eccentrically rotatable member is an eccentric shaft rotatable and concentrically fitted to said fixed member, said first intermediate member and said movable member but rotatably and eccentrically fitted to said second intermediate member.

21. The angular position adjusting device as set forth in claim 15, wherein said eccentrically rotatable member is an eccentric ring having an inner circumferential surface rotatably fitted to a shaft fixed to said fixed member and an outer circumferential surface rotatably and concentrically fitted to said movable member but rotatably and eccentrically fitted to said second intermediate member.

22. The angular position adjusting device as set forth in claim 15, wherein said inner gear is formed on said first intermediate member and said movable member, and said outer gear is formed on said second intermediate member.

23. The angular position adjusting device as set forth in claim 22, wherein the number of teeth of said outer gear is different from that of at least one of said inner gears formed on said first intermediate member and said movable member.

24. The angular position adjusting device as set forth in claim 23, wherein the numbers of teeth of both the inner gears are mutually different.

25. The angular position adjusting device as set forth in claim 15, wherein said inner gear is formed on said second intermediate member, and each of said outer gears is formed on said first intermediate member and said movable member, respectively.

26. The angular position adjusting device as set forth in claim 1, wherein said angular position adjusting device is an angular position adjusting mechanism for a back mirror of an automotive vehicle.

27. The angular position adjusting device as set forth in claim 2, wherein said eccentrically rotatable member comprises an eccentric shaft having a large-diameter portion and a small-diameter portion in an eccentric relationship between the large- and small-diameter portions, said eccentric shaft being operatively connected to said motor via a worm mechanism.

28. The angular position adjusting device as set forth in claim 2, wherein said eccentrically rotatable member comprises an eccentric shaft rotatably fitted to a fixed shaft fixed to any one of said fixed member and said movable member, said eccentric shaft being operatively connected to said motor via a worm mechanism.

29. The angular position adjusting device as set forth in claim 3, wherein a motor for rotating said eccentrically rotatable member is mounted on said movable member and operatively connected to the eccentrically rotatable member via a worm mechanism.

30. The angular position adjusting device as set forth in claim 15, wherein a motor for rotating said eccentrically rotatable member is mounted on said movable member and operatively connected to the eccentrically rotatable member via a worm mechanism.

31. The angular position adjusting device as set forth in claim 9, wherein a motor for rotating said eccentrically rotatable member is mounted on said fixed member and operatively connected to the eccentrically rotatable member via a worm mechanism.

* * * * *